Patented Nov. 20, 1934

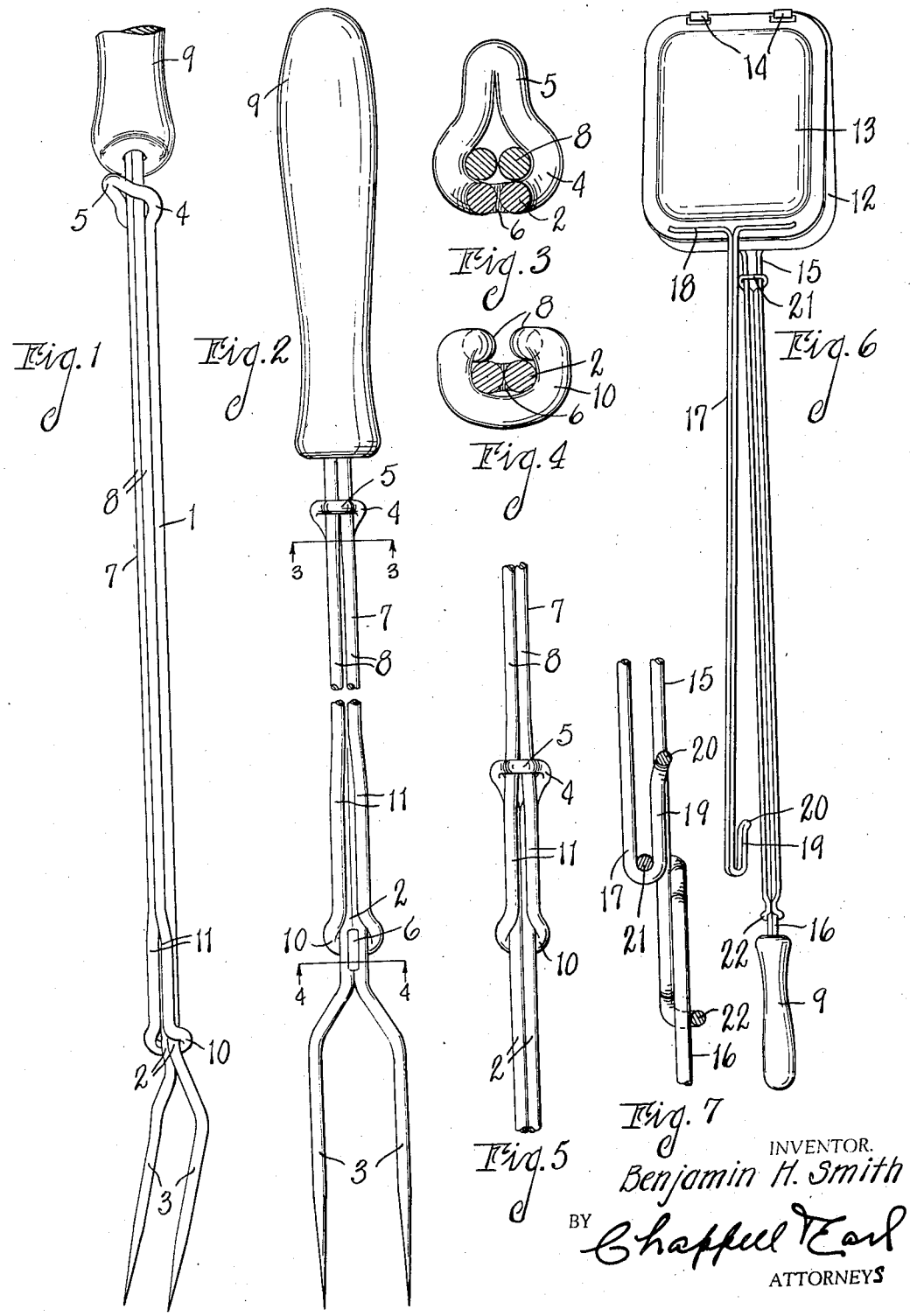

1,981,082

UNITED STATES PATENT OFFICE 1,981,082

HANDLE FOR KITCHEN OR CAMP IMPLEMENTS OR UTENSILS

Benjamin H. Smith, Niles, Mich., assignor to Michigan Wire Goods Company, Niles, Mich.

Application August 30, 1934, Serial No. 742,093

9 Claims. (Cl. 30—5)

The main object of this invention is to provide a kitchen or camp implement or utensil with an extension handle which when extended is very secure and may be collapsed to approximately one-half its extended length.

A further object is to provide a structure having these advantages which is very economical in its parts and easily kept in a sanitary condition.

A still further object is to provide a structure having these advantages which is very convenient to manipulate and one in which the handle is not likely to become accidentally collapsed.

Objects relating to details and economies of my invention will appear from the description to follow. The invention is defined and pointed out in the claims.

A structure which is a preferred embodiment of my invention is illustrated in the accompanying drawing, in which:

Fig. 1 is a perspective view of a fork embodying the features of my invention, a portion of the grip of the handle being broken away.

Fig. 2 is a fragmentary plan view.

Fig. 3 is an enlarged section on line 3—3 of Fig. 2.

Fig. 4 is an enlarged section on line 4—4 of Fig. 2.

Fig. 5 is a fragmentary plan view with the handle extended.

Fig. 6 is a plan view of a hand grill embodying the features of my invention with the cover or upper grill member partially opened, the handle being collapsed.

Fig. 7 is an enlarged longitudinal section showing the relation of the handle parts when the handle is fully extended and the utensil closed and locked or retained in closed position.

In Figs. 1 to 5 inclusive, I have shown my improvements as embodied by me in a kitchen or camping fork and in Figs. 6 and 7 as embodied in a hand grill. My improvements may be embodied in other forms of kitchen or camp implements such as spoons, broilers, toasters, and the like.

The extension handle comprises an elongated handle shank member 1 formed of a single piece of wire bent upon itself to provide parallel spaced reaches 2, the ends of the wire constituting the shank member being, in the embodiment shown in Figs. 1 and 2, extended into fork tines 3. The bight end is turned laterally and conformed to provide an eye 4 preferably extended to provide a finger piece 5. The reaches of the shank member are welded or otherwise secured together as indicated at 6 when they are extended to provide a fork.

I provide an elongated handle extension member designated generally by the numeral 7 and composed of a single piece of wire bent upon itself to provide substantially parallel reaches 8, 8. The ends of the wire are arranged in a suitable socket or longitudinal bore in the hand or grip piece 9 which is preferably of wood. The bight end of the handle extension member 7 is conformed and laterally offset to provide an eye 10.

The eye 4 of the shank handle member slidably embraces the reaches of the handle extension member while the eye 10 of the handle extension member slidably embraces the reaches of the handle shank member, the eyes being offset in opposite directions. The handle members are thus telescopingly connected, the eye of one member sliding upon the other. The reaches of the handle extension member are preferably offset at 11 adjacent the eye 10 so that when the handle is fully extended, the eye 4 slides upon these offset portions which constitute spring friction members, effectively retaining the handle in extended position.

Further, these offsets keep the eyes somewhat spaced as indicated in Fig. 5 when the handle is fully extended, thereby greatly adding to the rigidity of the handle when extended. This simple expedient provides a very effective means for retaining the parts in extended position.

In the embodiment of my invention shown in Fig. 6, I illustrate my improvements as applied to a grill consisting of a pair of pan-shaped members 12 and 13 hingedly connected at their outer ends as indicated at 14. In this embodiment, the handle shank member 15 is conformed supstantially as in the embodiment above hereinbefore described except that the reaches of the shank member are spaced somewhat. The ends of the wire forming the shank member are, in this embodiment, secured to the inner end of the utensil member 12. The handle extension member 16 of this embodiment is substantially the same as the extension member 7 of the structure described with the exception that it has no offsets 11. The utensil member 13 is provided with an auxiliary handle member 17 which is composed of a single piece of wire bent to provide substantially parallel reaches, the ends of the wire 18 being secured to the inner end of the utensil member 13. The bight end of this auxiliary handle member is conformed to provide an inwardly facing hook 19, the tip 20 of its bill being preferably turned outwardly relative to the main portion of the bill, the bill of the hook being adapted to lie between the spaced reaches of the shank handle member when the utensil is closed, as shown in Fig. 7. In this position, the hook is engaged by the eye 21 of the extension handle member, thereby holding the utensil members in closed position. The eye 22 of the shank handle member slidably embraces the reaches of the handle extension member so that the parts are associated, as stated, the same as in the embodiment shown in Figs. 1 to 5 inclusive.

Implements or utensils embodying my improvements are especially well adapted for camping or out-of-door use although desirable for embodiment in kitchen utensils or implements where storage space is an important factor.

My improved handle is very economical in its parts and is easily assembled and manipulated and when extended is strong and rigid, there being no parts to become disassembled or likely to become broken except under such conditions as would be likely to destroy the implement.

A further advantage is that structures embodying my improvements may, so far as the handle is concerned, be quite easily kept in a sanitary condition.

I have not attempted to illustrate or describe various embodiments or adaptations of my improvements which I contemplate as it is believed that this disclosure will enable those skilled in the art to embody or adapt my improvements as may be desired.

Having thus described my invention, what I claim as new and desire to secure by Letters Patent, is:

1. A utensil of the character described comprising in combination coacting holder members pivotally connected at their outer ends, an elongated shank handle member composed of a single piece of wire bent upon itself to provide parallel spaced reaches, the ends of the wire constituting the shank member being secured to the inner end of one of said holder members, the bight end being conformed to provide an eye disposed at an angle to the reaches, an elongated handle extension member composed of a single piece of wire bent upon itself to provide substantially parallel reaches, the bight end being conformed to provide an eye disposed at an angle to the reaches, the eye of the shank handle member slidably embracing the reaches of the handle extension member, the eye of the handle extension member slidably embracing the reaches of the shank handle member, and an auxiliary handle member composed of a single piece of wire bent to provide substantially parallel reaches, the ends of the wire constituting the auxiliary handle member being secured to the inner end of the other holder member, the bight end being conformed to provide an inwardly facing hook adapted to overlie the shank handle member with the bill of the hook between the reaches thereof and positioned to be engaged by the eye of the extension handle member when it is in its extended position.

2. A utensil of the character described comprising in combination coacting holder members pivotally connected at their outer ends, an elongated shank handle member composed of a single piece of wire bent upon itself to provide parallel reaches, the ends of the wire constituting the shank member being secured to the inner end of one of said holder members, the bight end being conformed to provide an eye disposed at an angle to the reaches, an elongated handle extension member composed of a single piece of wire bent upon itself to provide substantially parallel reaches, the bight end being conformed to provide an eye disposed at an angle to the reaches, the eye of the shank handle member slidably embracing the reaches of the handle extension member, the eye of the handle extension member slidably embracing the reaches of the shank handle member, and an auxiliary handle member composed of a single piece of wire bent to provide substantially parallel reaches, the ends of the wire constituting the auxiliary handle member being secured to the inner end of the other holder member, the bight end being conformed to provide an inwardly facing hook adapted to be engaged by the eye of the extension handle member when it is in its extended position and the utensil is closed for holding it closed.

3. A utensil of the character described comprising in combination coacting holder members pivotally connected at their outer ends, an elongated shank handle member composed of a single piece of wire bent upon itself to provide parallel reaches, the ends of the wire constituting the shank member being secured to the inner end of one of said holder members, the bight end being conformed to provide an eye disposed at an angle to the reaches, an elongated handle extension member composed of a single piece of wire bent upon itself to provide substantially parallel reaches, a hand piece receiving the ends of the wire constituting the extension handle member, the bight end being conformed to provide an eye disposed at an angle to the reaches, the eye of the shank handle member slidably embracing the reaches of the handle extension member, the eye of the handle extension member slidably embracing the reaches of the shank handle member, and an auxiliary handle member composed of a single piece of wire bent to provide substantially parallel reaches, the ends of the wire constituting the auxiliary handle member being secured to the inner end of the other holder member, the bight end being conformed to provide an inwardly facing hook adapted to be engaged by the eye of the extension handle member when it is in its extended position and the utensil is closed for holding it closed.

4. The combination with a utensil, of an elongated shank handle member composed of a single piece of wire bent upon itself to provide substantially parallel reaches, the ends of the wire constituting the shank member being connected to the utensil, the bight end being conformed to provide an eye disposed at an angle to the reaches, an elongated handle extension member composed of a single piece of wire bent upon itself to provide substantially parallel reaches, and a hand piece receiving the ends of the wire constituting the extension handle member, the bight end being conformed to provide an eye disposed at an angle to the reaches, the eye of the shank handle member slidably embracing the reaches of the handle extension member, the eye of the handle extension member slidably embracing the reaches of the shank handle member.

5. The combination with a utensil, of an elongated shank handle member composed of a single piece of wire bent upon itself to provide substantially parallel reaches, the ends of the wire constituting the shank member being connected to the utensil, the bight end being conformed to provide an eye disposed at an angle to the reaches, and an elongated handle extension member composed of a single piece of wire bent upon itself to provide substantially parallel reaches, the bight end being conformed to provide an eye disposed at an angle to the reaches, the eye of the shank handle member slidably embracing the reaches of the handle extension member, the eye of the handle extension member slidably embracing the reaches of the shank handle member.

6. The combination with a utensil, of an elongated shank handle member composed of a single piece of wire bent upon itself to provide substantially parallel reaches, the ends of the wire constituting the shank member being connected to the utensil, the bight end being conformed to provide an eye disposed at an angle to the reaches, the eye being extended to provide a finger piece, and an elongated handle extension member composed of a single piece of wire bent upon itself to provide substantially parallel reaches, the bight end being conformed to provide an eye disposed at an angle to the reaches, the eye of the shank handle member slidably embracing the reaches of the handle extension member, the eye of the handle extension member slidably embracing the reaches of the shank handle member, the reaches of the handle extension member being laterally offset adjacent the eye thereof to provide spring members with which the eye of the extension handle member coacts when the handle is extended.

7. In a utensil the combination of an elongated shank handle member composed of a single piece of wire bent upon itself to provide substantially parallel reaches, the ends of the wire constituting the shank member being extended to provide the tines of a fork, the bight end being conformed to provide an eye disposed at an angle to the reaches, an elongated handle extension member composed of a single piece of wire bent upon itself to provide substantially parallel reaches, and a hand piece receiving the ends of the wire constituting the extension handle member, the bight end being conformed to provide an eye disposed at an angle to the reaches, the eye of the shank handle member slidably embracing the reaches of the handle extension member, the eye of the handle extension member slidably embracing the reaches of the shank handle member.

8. In a utensil the combination of an elongated shank handle member composed of a single piece of wire bent upon itself to provide substantially parallel reaches, the ends of the wire constituting the shank member being extended to provide the tines of a fork, the bight end being conformed to provide an eye disposed at an angle to the reaches, and an elongated handle extension member composed of a single piece of wire bent upon itself to provide substantially parallel reaches, the bight end being conformed to provide an eye disposed at an angle to the reaches, the eye of the shank handle member slidably embracing the reaches of the handle extension member, the eye of the handle extension member slidably embracing the reaches of the shank handle member.

9. In a utensil, the combination of an elongated shank handle member composed of a single piece of wire bent upon itself to provide substantially parallel reaches, the ends of the wire constituting the shank member being extended to provide the tines of a fork, the bight end being conformed to provide an eye disposed at an angle to the reaches, the eye being extended to provide a finger piece, and an elongated handle extension member composed of a single piece of wire bent upon itself to provide substantially parallel reaches, the bight end being conformed to provide an eye disposed at an angle to the reaches, the eye of the shank handle member slidably embracing the reaches of the handle extension member, the eye of the handle extension member slidably embracing the reaches of the shank handle member, the reaches of the handle extension member being laterally offset adjacent the eye thereof to provide spring members with which the eye of the extension handle member coacts when the handle is extended.

BENJAMIN H. SMITH.